(12) United States Patent
Maynard et al.

(10) Patent No.: US 9,295,919 B2
(45) Date of Patent: Mar. 29, 2016

(54) SMART PING SYSTEM

(71) Applicant: Zynga Inc., San Francisco, CA (US)

(72) Inventors: Jordan D. Maynard, Palo Alto, CA (US); Jason C. Leong, Morgan Hill, CA (US); Cameron McNeil, San Mateo, CA (US)

(73) Assignee: Zynga Inc., San Francisco, CA (US)

( * ) Notice: Subject to any disclaimer, the term of this patent is extended or adjusted under 35 U.S.C. 154(b) by 60 days.

(21) Appl. No.: 14/211,877

(22) Filed: Mar. 14, 2014

(65) Prior Publication Data

US 2014/0274410 A1 Sep. 18, 2014

Related U.S. Application Data

(60) Provisional application No. 61/799,868, filed on Mar. 15, 2013.

(51) Int. Cl.
A63F 13/10 (2006.01)
A63F 13/87 (2014.01)
A63F 13/30 (2014.01)

(52) U.S. Cl.
CPC ............. A63F 13/87 (2014.09); A63F 13/30 (2014.09)

(58) Field of Classification Search
USPC ....................................... 463/30, 42
See application file for complete search history.

(56) References Cited

U.S. PATENT DOCUMENTS

| | | | | |
|---|---|---|---|---|
| 2013/0065688 A1* | 3/2013 | Podoloff | ............... | G06F 3/0219 463/37 |
| 2014/0080428 A1* | 3/2014 | Rhoads | ............. | G06F 17/30241 455/88 |
| 2014/0155166 A1* | 6/2014 | Ealey | ................... | A63F 13/005 463/31 |
| 2014/0228119 A1* | 8/2014 | Koenig | ................... | A63F 13/10 463/32 |

* cited by examiner

*Primary Examiner* — Pierre E Elisca
(74) *Attorney, Agent, or Firm* — Schwegman Lundberg & Woessner, P.A.

(57) ABSTRACT

A system, computer-readable storage medium storing at least one program, and a computer-implemented method for providing a smart ping mechanism are presented. For example, an example embodiment may generate a game board on a first client device and a second client device. Then, the embodiment may detect, from the first client device, user activation of a smart ping mechanic. Responsive to detecting the user activation, the embodiment may generate, on the first client device, one or more user selectable communication artifacts based at least in part on contextual data derived from the game board. Then, responsive to detecting a user selection of one of the user selectable communication artifacts, the embodiment may surface the selected communication artifact to the second client device.

14 Claims, 9 Drawing Sheets

SMART PING SYSTEM

CROSS REFERENCE TO RELATED APPLICATIONS

This application claims priority from U.S. Provisional Application No. 61/799,868, entitled "Smart Ping System" and filed Mar. 15, 2013, all of which is incorporated herein by reference in its entirety for all purposes.

TECHNICAL FIELD

The present disclosure relates to gaming systems. In particular, an example gaming system provides a smart ping system.

BACKGROUND

Growth in computer networks has changed the uses of computers dramatically. The largest computer network, commonly known as the Internet or World Wide Web ("WWW"), is now connecting millions of computing devices in the world, providing services like email, file transfer, and hypermedia information retrieval across different computer platforms.

In addition to providing the above services (e.g., email, file transfer, etc), computer networks have increased the social nature of online game. For example, traditional gaming systems may host a game on a game server where multiple players can join and compete simultaneously. For example, LEAGUE OF LEGENDS, developed by RIOT GAMES, forms groups of players into even teams. In LEAGUE OF LEGENDS, the winner of the game is the team that destroys a so called "nexus" associated with the opposing team. Accordingly, the team members typically communicate with each other to coordinate defensive positions and attacking advances as they defend their team's nexus and attempt to destroy the other team's nexus.

In these traditional games, specialized communications (e.g., defend this location or attack this character) usually occurs through a chat window were users can use their keyboards to type in their instructions or messages during actual game play in substantially real-time. Traditional games generally provide another, perhaps more limiting, mechanism for communicating with team members through a so called "ping" mechanism. The ping mechanism may be initiated when a player activates a predetermined input (e.g., a certain sequence or combination of keys, mouse buttons, or physical gestures, such as through a touch screen, for example) mapped to the ping command. When the gaming system detects that a player has initiated a ping, the gaming system may cause a predetermined visual indication to appear on the displays of other players in the team. A blinking image (e.g., dot or cursor image) is an example of a predetermined visual indication. A team may discuss prior to play the game that a ping may refer to a location in which the pinging player wants other players to meet.

Accordingly, in traditional gaming systems, players generally discuss and agree to the meaning of a ping prior to playing the game or prior to using the ping mechanism.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
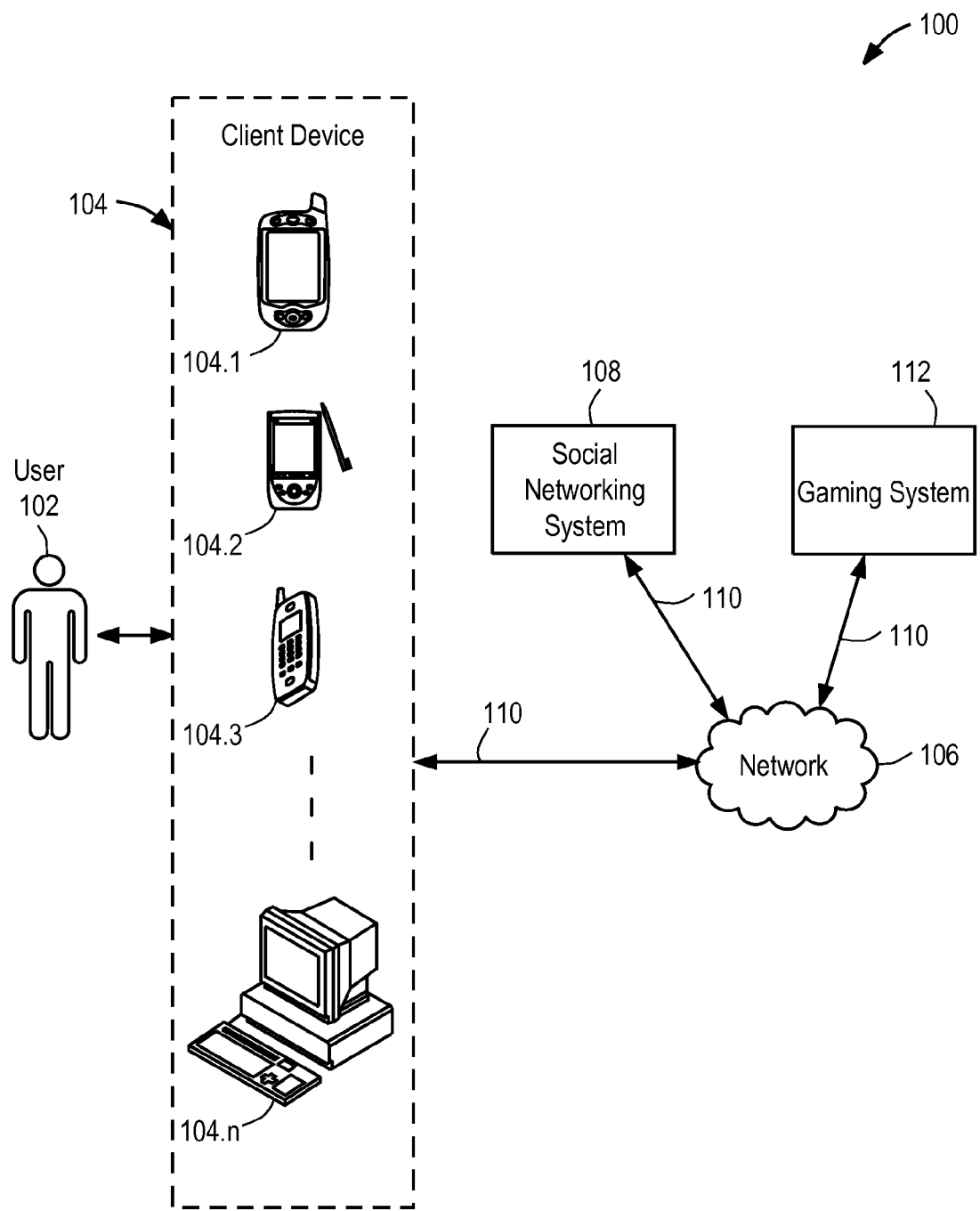
FIG. 1 is a system diagram illustrating an example of a gaming environment for implementing various example embodiments.

Users of computer-implemented systems may access a gaming system to interact with an online game. For example, a player may access a gaming system, as provided by ZYNGA, INC.®, to play an online game that allows players to initiate a smart ping mechanic. As used herein, a smart ping may be a communication artifact in which the visual representation of the communication artifact depends at least in part on the context of a game board. For example, a gaming system may, responsive to detecting a player initiating a smart ping request, obtain contextual data associated with the smart ping request. Contextual data may include a location within the game board of the smart ping request, locations of other team members, locations of opposing team members, health of one or more players, and the like. Based at least in part on the contextual data, the gaming system may select one or more communication artifacts that are presentable to other players in the game. In some cases, each communication artifact may represent a different message that is to be surfaced to the displays of the other players.

In some embodiments, the gaming system may generate a context sensitive menu of possible communication artifacts that may be surfaced to the other players. The context sensitive menu may be generated based at least in part on the context of the game board. For example, if a treasure is located within the game board, the context sensitive menu may list "Get!" as a communication artifact that may be selected by the user. Additionally or alternatively, if a member of the opposing team is located within the game board, the gaming system may list "Attack!" as a communication artifact that may be selected by the user. The gaming system may present a relationship between the user selectable communication artifact and the context of the game board that caused the gaming system to list that user selectable communication artifact. For example, the gaming system may present the game artifact as a graphical image substantially near the context (e.g., the treasure or a member of a team) of the game board.

Some embodiments of the smart ping may find many practical applications. For example, some embodiments may provide communication artifacts that are visually tailored to provide more explicit communications to players within a team. For example, some embodiments may provide one visual indication to alert teammates to retreat to a particular location. As another example, another visual indication may represent an alert to have teammates attack a particular location within a game board. As yet another example, another visual indication may be used to communicate an alert to teammates to heal a specified teammate. As another example, another visual indication may be used to communicate an alert to teammates that a member of the opposing team may be ambushing a specified location. It is to be appreciated that the above examples are provided merely for illustration and should not be considered limiting other possible embodiments that are consistent with this disclosure. For example, in one embodiment, a smart ping system may be used in a sports game such as a football game. In such football games, the smart ping system may be used to obtain contextual data regarding a formation and a location where the smart ping was initiated. Based on those factors, the smart ping system may provide a communication artifact that communicates, for example, whether a defender is blitzing, or location where the player expects a pass, where a play will be run, and the like.

These and other embodiments of the invention are described, by way of example, in further detail below.

Example System

FIG. 1 is a system diagram illustrating an example of a gaming environment 100 for implementing various example embodiments that provide destructible game objects. In some embodiments, the gaming environment 100 comprises a user 102, a client device 104, a network 106, a social networking system 108, and a gaming system 112. The components of the gaming environment 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the user 102, the client device 104, the social networking system 108, the gaming system 112, and the network 106, any suitable arrangement or configuration of the user 102, the client device 104, the social networking system 108, the gaming system 112, and the network 106 may be contemplated.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108 or the gaming system 112 directly, via the network 106, or via a third-party system. For example, the client device 104 may access the gaming system 112 via the social networking system 108.

In some embodiments, the client device 104 may be communicatively coupled to or include an input device, such as a keyboard, a pointing device, and a display device (not shown). Such input devices may allow a user to interact with a game provided by the gaming system 112. For example, with the input devices, the client device 104 may allow a user to select (e.g., through a mouse click or a finger tap on a touch screen) a game object.

The social networking system 108 may include a network-addressable computing system that can host one or more social graphs (see for example FIG. 2), and may be accessed by the other components of system 100 either directly or via the network 106. The social networking system 108 may generate, store, receive, and transmit social networking data.

Figure 2:
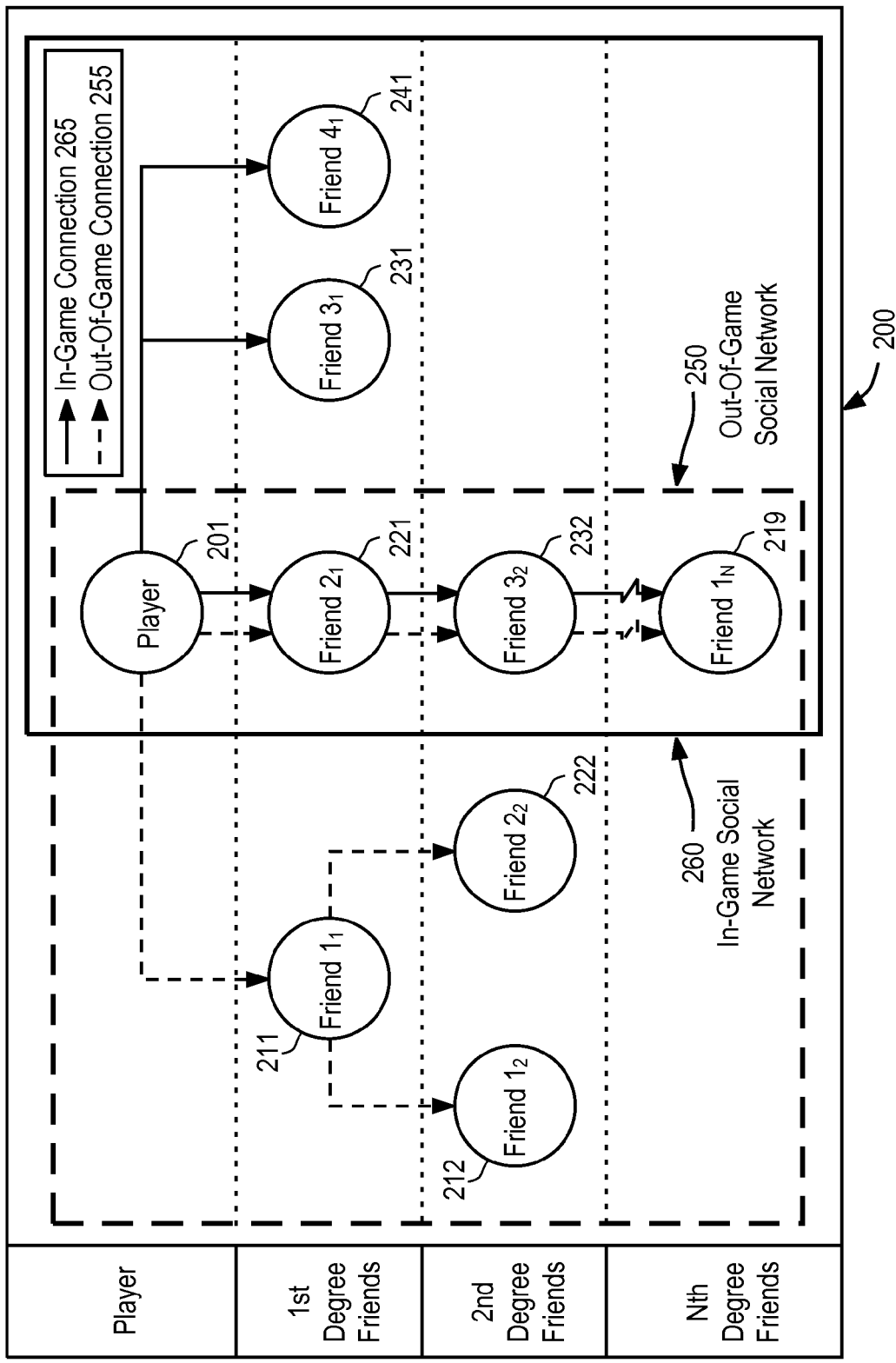
FIG. 2 is a diagram showing an example of a social network within a social graph, according to some embodiments.

FIG. 2 is a diagram showing an example of a social network within a social graph 200. The social graph 200 is shown by way of example to include an out-of-game social network 250 and an in-game social network 260. Moreover, the in-game social network 260 may include one or more users that are friends with Player 201 (e.g., Friend $3_1$ 231), and may include one or more other users that are not friends with Player 201. The social graph 200 may correspond to the various users associated with the virtual game. In an example embodiment, player may send game requests to each other. For example, Player 201 may send communication (e.g., a configurable crew request) to Friend $3_1$ 231. FIG. 2 and the social graph 200 are described in greater detail below.

With reference back to FIG. 1, the gaming system 112 may include a network-addressable computing system (or systems) that can host one or more online games. The gaming system 112 may generate, store, receive, and transmit game-related data, such as, for example, game account data, game input, game state data, and game displays. The gaming system 112 may be accessed by the other components of the gaming environment 100 either directly or via the network 106. The user 102 may use the client device 104 to access, send data to, and receive data from the social networking system 108 and/or the gaming system 112.

Example Embodiments of a Smart Ping System

This section now describes various aspects of a smart ping system, as may be implemented by the gaming system 112, social networking system 108, the client device 102, or a combination thereof. It is to be appreciated that the example embodiments described herein are provided merely for illustration and clarity of description. Consequently, the embodiments described here should not be interpreted as limiting the scope of other example embodiments that are consistent with this disclosure.

Figure 3:
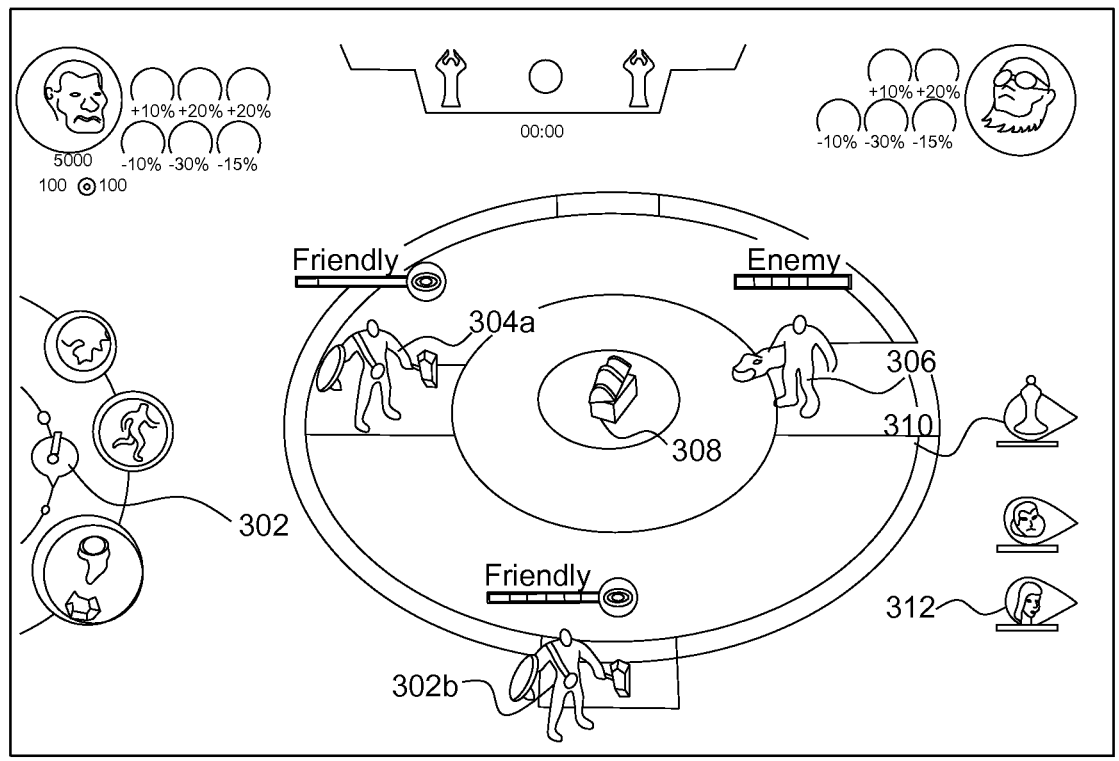
FIG. 3 is a diagram illustrating a display of a game generated by a gaming system 112, according to an example embodiment.

FIG. 3 is a diagram illustrating a display of a game generated by a gaming system 112, according to an example embodiment. It is to be appreciated that the display shown in FIG. 3 is provided merely for the purpose of illustration and other embodiments may generate different displays, as may correspond with other types of games and other instances of a game.

As shown, the display of the game may include a smart ping activator 302, team members 304a-b, opposing team member 306, a collectible game object 308, an opposing team member indicator 310, and a team member indicator 312.

The smart ping activator 302 may be user interface element that when activate by the player, causes the gaming system 112 to provide a contextual menu. As described above, the contextual menu may provide one or more user selectable communication artifacts that can be surfaced to other players of the game. The contextual menu is described in greater detail below, with respect to FIG. 4.

The team members 304a-b may be player characters or avatars that represent one or more players playing the game hosted by the gaming system 112. For example, the team member 304a may be a player character controlled by the player 102 operating the client device 104, while the team member 304b may be a player character controlled by another playing operating another client device, possibly remote from the player 102. The opposing team member 306 may be a player character or avatar representing another player playing the game hosted by the gaming system 112. In some embodiments, the team members 304a-b may be on a team that is competing against a team that includes the opposing team member 306.

The collectible game object 308 may be a game object that may be acquired by a player character (e.g., the team members 304a-b or the opposing team member 306). Acquiring the collectible game object 308 may confer an in-game benefit to the acquiring player character. For example, the benefit may increase a property associated with the player character or modify the state of the game board (e.g., freeze certain player characters, slow time for certain characters, or the like) or other player characters (e.g., global damage to player characters on the opposing team). Once collected by a player character, the gaming system 112 may remove the collectible game object 308 from the game board.

The opposing team member indicator 310 and the team member indicator 312 may each be visual indications representing player characters outside the view of the game board. In some cases, such as the case of FIG. 3, the opposing team member indicator 310 and the team member indicator 312 may display properties of the player characters, such as an image associated with the player character, the health of the player characters, the team of the player character, and the like.

Figure 4:
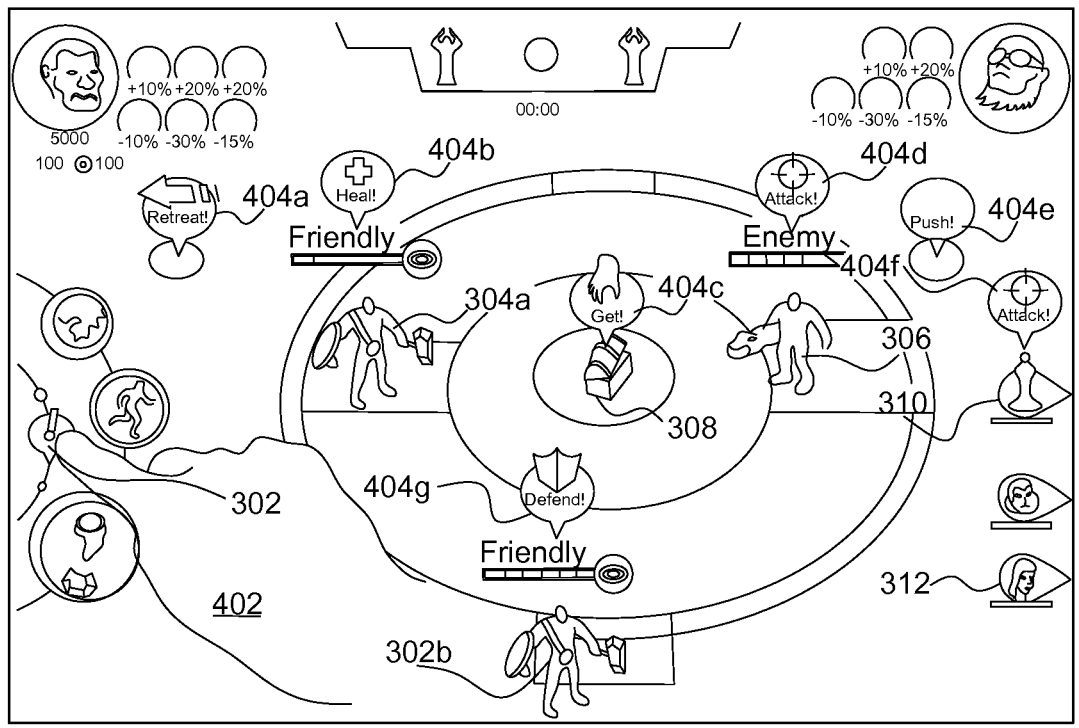
FIG. 4 is a diagram illustrating a display of a game generated by a gaming system that provides a contextual menu for smart pings, according to an example embodiment.

FIG. 4 is a diagram illustrating a display of a game generated by a gaming system 112 that provides a contextual menu for smart pings, according to an example embodiment. The contextual menu may be represented by a number of user selectable communication artifacts 404a-g. In an example embodiment, the selectable communication artifacts may be displayed responsive to the player 102 activating the smart ping activator 302. This is shown by the hand 402 making physical contact with the image of the smart ping activator 302, on a touch screen, for example. Although FIG. 4 shows that player 102 activates the smart ping activator 302 through a touch screen, it is to be appreciated that other embodiments may user other types of user input to activate the smart ping activator 302, such as a mouse device, keyboard, game controller, remote, or the like.

As FIG. 4 shows, the contextual menu includes a visual indication of the following user selectable communication artifacts, with contextual triggers:

a "Retreat": The user selectable "Retreat" communication artifact 404a may be triggered when there is a determinable distance between one or more players and a zone (e.g., a side designated as belonging to a team).

b "Heal!": The user selectable "Heal" communication artifact 404b may be triggered when a team member is below a threshold health status. For example, the team member 304a may have less than a quarter of life remaining, which may trigger the user selectable communication artifact 404b.

c "Get!": The user selectable "Get!" communication artifact 404c may be triggered when a collectible game object is within the game board. As FIG. 4 shows, the "Get!" communication artifact may be displayed substantially near the collectible game object 308.

d "Attack!": The user selectable "Attack!" communication artifact 404d may be triggered when an opposing team member is within the displayable area of the game board. The "Attack!" communication artifact may be displayed substantially near the opposing team member (e.g., the opposing team member 306).

e "Push!": The user selectable "Push!" communication artifact 404e may be triggered when there is a determinable distance between one or more players and a zone (e.g., a side designated as belonging to the opposing team).

f "Attack!": The user selectable "Attack!" communication artifact 404f may be triggered when there is a opposing team member outside the view of the game board. In some embodiments, the "Attack!" communication artifact 404f may be displayed substantially near the opposing member indicator 310.

g "Defend!": The user selectable "Defend!" communication artifact 404g may be triggered when there is a determinable distance between one or more players and a zone (e.g., a side designated as belonging to the opposing team).

In some embodiments, the visual images of the user selectable communication artifacts 404a-g are translucent (e.g., 50%) to signify that they are options for selection by the player. Further, as the contextual menu is displayed to the player, only the instance of the game operating on their client device shows the contextual menu and corresponding user selectable communication artifacts. That is, the gaming system 112 has not yet surfaced the contextual menu to the other players and the other players do not see the contextual menu.

It is to be appreciated that the contextual menu shown in FIG. 4 is provided merely as an example for clarity of description and other embodiments consistent with this disclosure may display contextual menus arranged in different formats or with different communication artifacts. For example, in some cases, the contextual menu may appear as a list of user selectable communication artifacts and, additionally or optionally, highlighting (e.g., selecting or hovering a cursor over) a communication artifact from the list may highlight where the communication artifact will appear on the displays of the other players.

Figure 5:
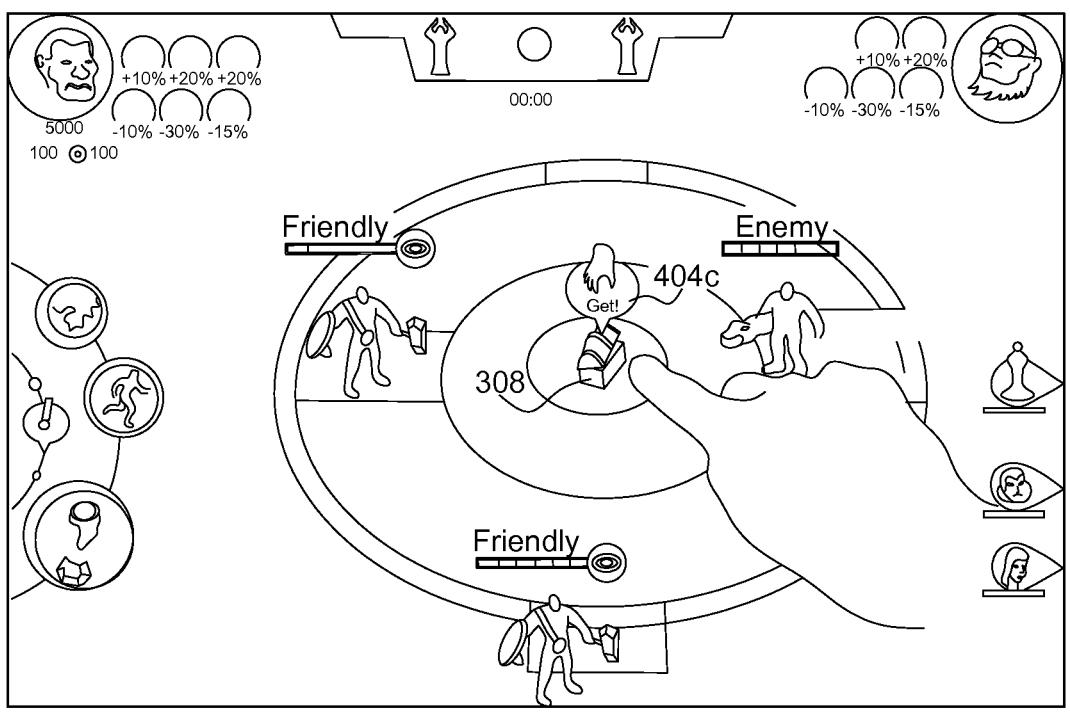
FIG. 5 shows a display of the game response to the player selecting a user selectable communication artifact from the contextual menu, according to an example embodiment.

FIG. 5 shows a display of the game response to the player selecting a user selectable communication artifact from the contextual menu, according to an example embodiment. For example, the player have selected the user selectable communication artifact 404c associated with the collectible game object 308. Accordingly, the gaming system may update the display of the user selectable communication artifact 404c (e.g., make the user selectable communication artifact 0% translucent). At this point, that is, when the player selects the user selectable communication artifact, the gaming system 112 updates the display of other players to also display the selected communication artifact. Thus, other players will also see the communication artifact 404c. In some embodiments, the gaming system 112 will surface the communication artifact to a limited number of players and, in some cases, the limiting may be based on some attribute associated with the player, such as team affiliation, role within the team, player designated grouping etc.

As previously described above, in some cases, the player may initiate a smart ping mechanic by activating a smart ping activator (e.g., the smart ping activator 302). However, other embodiments may initiate a smart ping mechanic responsive to detecting user input mapped to the smart ping, such as a double tap, tap with two fingers, or any other input. Responsive to detected the mapped user input, the gaming system 112 may generate the contextual menu described above or, in some other embodiments, may generate a suggested smart ping based on the location of where the mapped input occurred. For example, if the smart input occurred substantially near the collectible gift, the gaming system 112 may generated the "Get!" communication artifact 404c. Or if the smart input occurred substantially near the opposing team member, the gaming system 112 may generate the "Attack!" communication artifact 404f. It is to be appreciated that any other suitable communication artifact may be generated based on the context of the mapped input.

Figure 6:
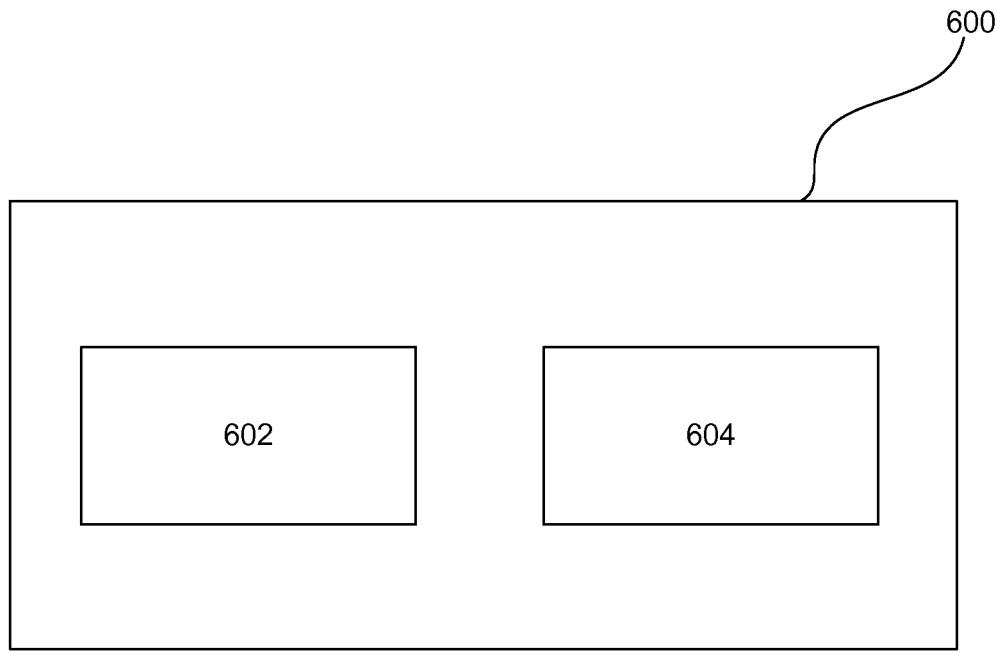
FIG. 6 is a block diagram illustrating modules of a smart ping computer system that may implement a smart ping system, according to an example embodiment.

Examples of the modules operable to facilitate a smart ping system are now described. For example, FIG. 6 is a block diagram illustrating modules of a smart ping computer system 600 that may implement a smart ping system, according to an example embodiment. The smart ping computer system 600 may be one or more computer systems deployed within the components and systems shown in FIG. 1. For example, the smart ping computer system 600 may be deployed within the client device 104, the gaming system 112, or some combination thereof.

FIG. 6 shows that the smart ping computer system 600 includes a game engine 602 and a smart ping engine 604. The game engine 602 may be a computer-implemented module configured to process game logic and game data that express the game rules and logic of a game. For example, the game engine 602 may be configured to execute or simulate a game action on a game object, which may in turn involve updating the state of the game object or any other affected part of the game. The game engine 602 may be configured to further coordinate the game states among multiple client devices which may be playing a multiplayer game hosted by the gaming system 112.

The smart ping engine 604 may be a computer-implemented module configured to generate user selectable communication artifacts based on the context of a game board. The smart ping engine 604 may also be configured to, responsive to detecting a user selection of a user selectable communication artifact, surfacing the selected user selectable communication artifact to one or more players of an online game.

Figure 7:
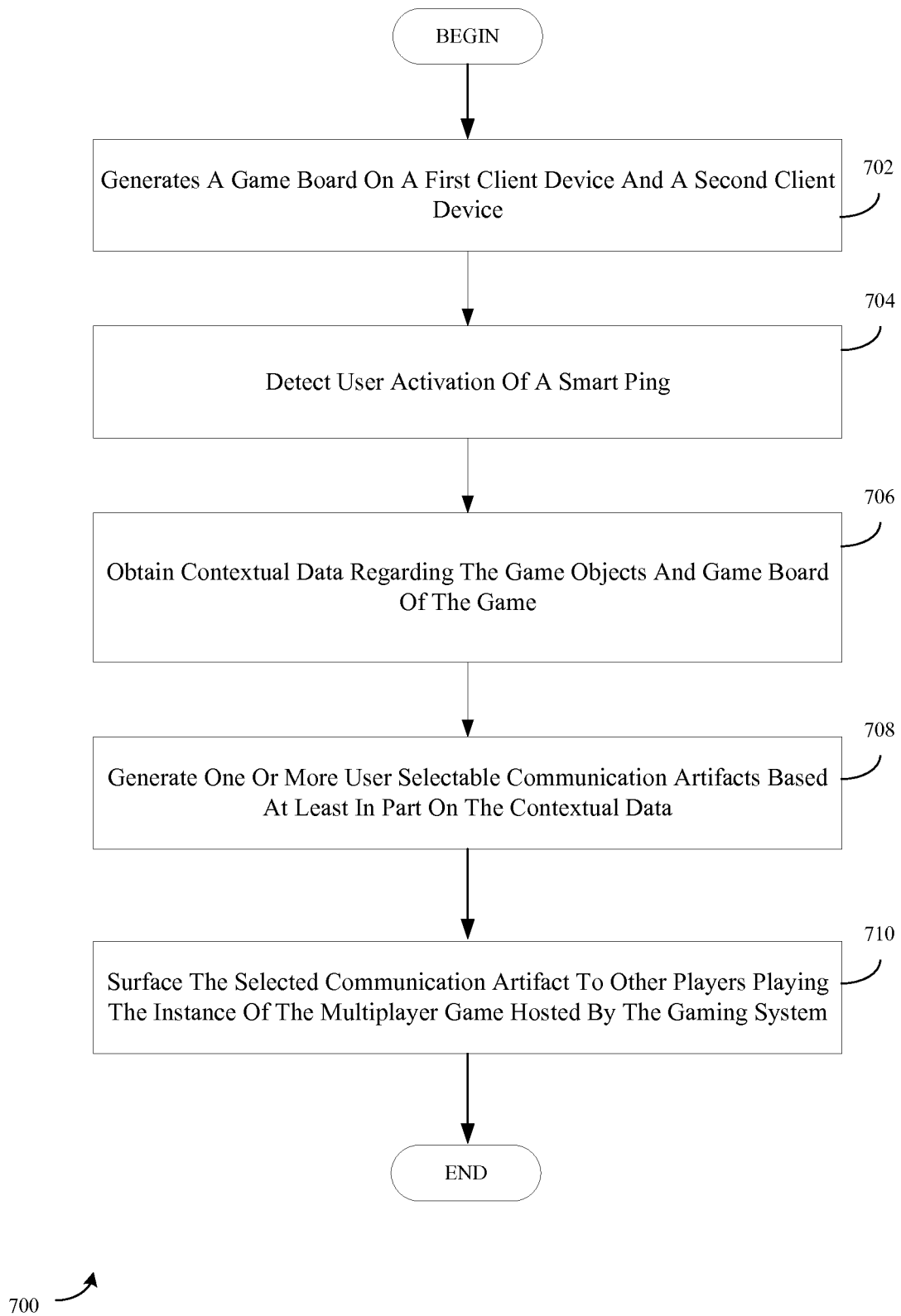
FIG. 7 is a flowchart showing a method of surfacing communication artifacts to one or more players of an online game, according to an example embodiment.

The operation of the smart ping computer system 600 is now described in greater detail. For example, FIG. 7 is a flowchart showing a method 700 of surfacing communication artifacts to one or more players of an online game, according to an example embodiment. In some embodiments, the method 700 is implemented by one or more processors, as may be executed by one or more of the modules shown in FIG. 6.

As FIG. 7 shows, the method 700 may begin at operation 702 when the game engine 602 generates a game board on a first client device and a second client device. Operation 702 may be executed when, for example, two or more players initiate an instance of a multiplayer game hosted by the gaming system 112, such as LEAGUE OF LEGENDS, or the like. In these cases, the game engine 602 may coordinate with the first client device and the second client device so that both client devices render game data relating to the same gaming environment. When the game board is rendered on the first client device and the second client device, the players operating those devices may begin playing the multiplayer game. It is to be appreciated that the first client device and second client device may render different parts of the game board, as may depend on the location of the avatar that the player using one of those devices controls.

At operation 704, the smart ping engine 604 may detect user activation of a smart ping mechanic, as may be activated through a user input on the first client device. For example, with momentary reference back to FIG. 4, the user may have activated (clicked, selected, or performed any other suitable user input) the smart ping activator 302. In other cases, a particular user input is detected, where the type of user input maps to the smart ping game action. Such types of user inputs may include a particular button on a mouse, keyboard, game controller, or a touchscreen user input, such as a given swipe, tap, or the like.

At operation 706, the smart ping engine 604, responsive to detecting the user activation, may obtain contextual data regarding the game objects and game board rendered on the first client device. As described above, the contextual data may include may include a location within the game board of the smart ping request, locations of other team members, locations of opposing team members, health of one or more players, an availability of a collectible game object, and the like. In some embodiments, the contextual data may be contextual data that is limited is the display area of the game board rendered by the first client device, while in other embodiments, the contextual data may include contextual data derived from other areas of the game board that are not rendered by the first client device.

At operation 708, the smart ping engine 604 may generate, on the first client device, one or more user selectable communication artifacts based at least in part on the contextual data. For example, with momentary reference to FIG. 4, the smart ping engine 604 may cause the game engine 602 to display the user selectable communication artifacts 404a-g. That is, the user selectable communication artifacts 404a may be generated based on the relative position of one or more player characters, the user selectable communication artifacts 404b may be generated based on a health state of a player character (e.g., team member 304a), the user selectable communication artifacts 404c may be generated based on the a collectible game object being located in a visual portion of the game board, the user selectable communication artifacts 404d may be generated based on an opposing team member (e.g., the opposing team member 306) being located within a visible portion of the game board, the user selectable communication artifacts 404e may be generated based on the relative position of one or more player characters (e.g., the team members 304a-b, or the opposing team member 306), the user selectable communication artifacts 404f may be generated based on an opposing team member indicator (e.g., the opposing team member indicator 310) being located within a visible portion of the game board, and the user selectable communication artifacts 404g may be generated based on a team member (e.g., the team member 302b) being located within a visible portion of the game board and having or exceeding a given amount of health.

It is to be appreciated that at this point, according to some embodiments, the smart ping engine 604 does not generate the user selectable communication artifacts on the second client device.

At operation 710, the smart ping engine 604 may, responsive to detecting a user selection of one of the user selectable communication artifacts, surface the selected communication artifact to other players playing the instance of the multiplayer game hosted by the gaming system 112, such as the second client device. The other players may be team members of the first player. For example, the selected communication artifact may be made visible to the second player. Surfacing the selected communication artifact may involve the smart ping engine 604 causing the game engine 602 to display the selected communication artifact to the second player.

It is to be appreciated that the surfacing of the selected communication artifact may be limited by some embodiments of the smart ping system to team member of the player operating the first client device. Thus, if other players are playing in the instance of the multiplayer game and those players or on an opposing team from the player operating the first client device, the smart ping engine 604 elect to not render the selected communication artifact on the client devices operated by members of the opposing team.

As can be appreciated that some embodiments of a smart ping system may find many practical applications. For example, some embodiments may provide communication artifacts that are visually tailored to provide more explicit communications to players within a team. For example, some embodiments may provide one visual indication to alert teammates to retreat to a particular location. As another example, another visual indication may represent an alert to have teammates attack a particular location within a game board. As yet another example, another visual indication may be used to communicate an alert to teammates to heal a specified teammate. As another example, another visual indication may be used to communicate an alert to teammates that a member of the opposing team may be ambushing a specified location. It is to be appreciated that the above examples are provided merely for illustration and should not be considered limiting other possible embodiments that are consistent with this disclosure. For example, in one embodiment, a smart ping system may be used in a sports game such as a football game. In such football games, the smart ping system may be used to obtain contextual data regarding a formation and a location where the smart ping was initiated. Based on those factors, the smart ping system may provide a communication artifact that communicates, for example, whether a defender is blitzing, or location where the player expects a pass, where a play will be run, and the like.

Example Gaming Systems

A virtual game may be hosted by the gaming system 112, which can be accessed using any suitable connection 110 with a suitable client device 104. A user may have a game account on the gaming system 112, wherein the game account may contain a variety of information associated with the user (e.g., the user's personal information, financial information, purchase history, player character state, game state, etc.). In some embodiments, a user may play multiple games on the gaming system 112, which may maintain a single game account for the user with respect to the multiple games, or multiple individual game accounts for each game with respect to the user. In some embodiments, the gaming system 112 may assign a unique identifier to a user 102 of a virtual game hosted on the gaming system 112. The gaming system 112 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and control the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108, or the gaming system 112). For example, the client device 104 may download client components of a virtual game, which are executed locally, while a remote game server, such as the gaming system 112, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the gaming system 112.

In some embodiments, the user 102 accesses particular game instances of a virtual game. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the gaming system 112, which is managed by the game operator.

In other embodiments, the social graph is part of a social networking system 108 managed by a third party (e.g., Facebook, Friendster, Myspace). In yet other embodiments, the user 102 has a social network on both the gaming system 112 and the social networking system 108, wherein the user 102 can have a social network on the gaming system 112 that is a subset, superset, or independent of the user's social network on the social networking system 108. In such combined systems, game network system 112 can maintain social graph information with edge-type attributes that indicate whether a given friend is an "in-game friend," an "out-of-game friend," or both. The various embodiments disclosed herein are operable when the social graph is managed by the social networking system 108, the gaming system 112, or both.

Example Systems and Methods

Returning to FIG. 2, the User 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to User 201. As used herein, the terms "user" and "player" can be used interchangeably and can refer to any user in an online multiuser gaming system or social networking system. As used herein, the term "friend" can mean any node within a user's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In the social graph 200, it is possible for individuals to be connected to other individuals through their first-degree friends (e.g., friends of friends). As described above, the number of edges in a minimum path that connects a user to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of users, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that can be the case.

Figure 8:
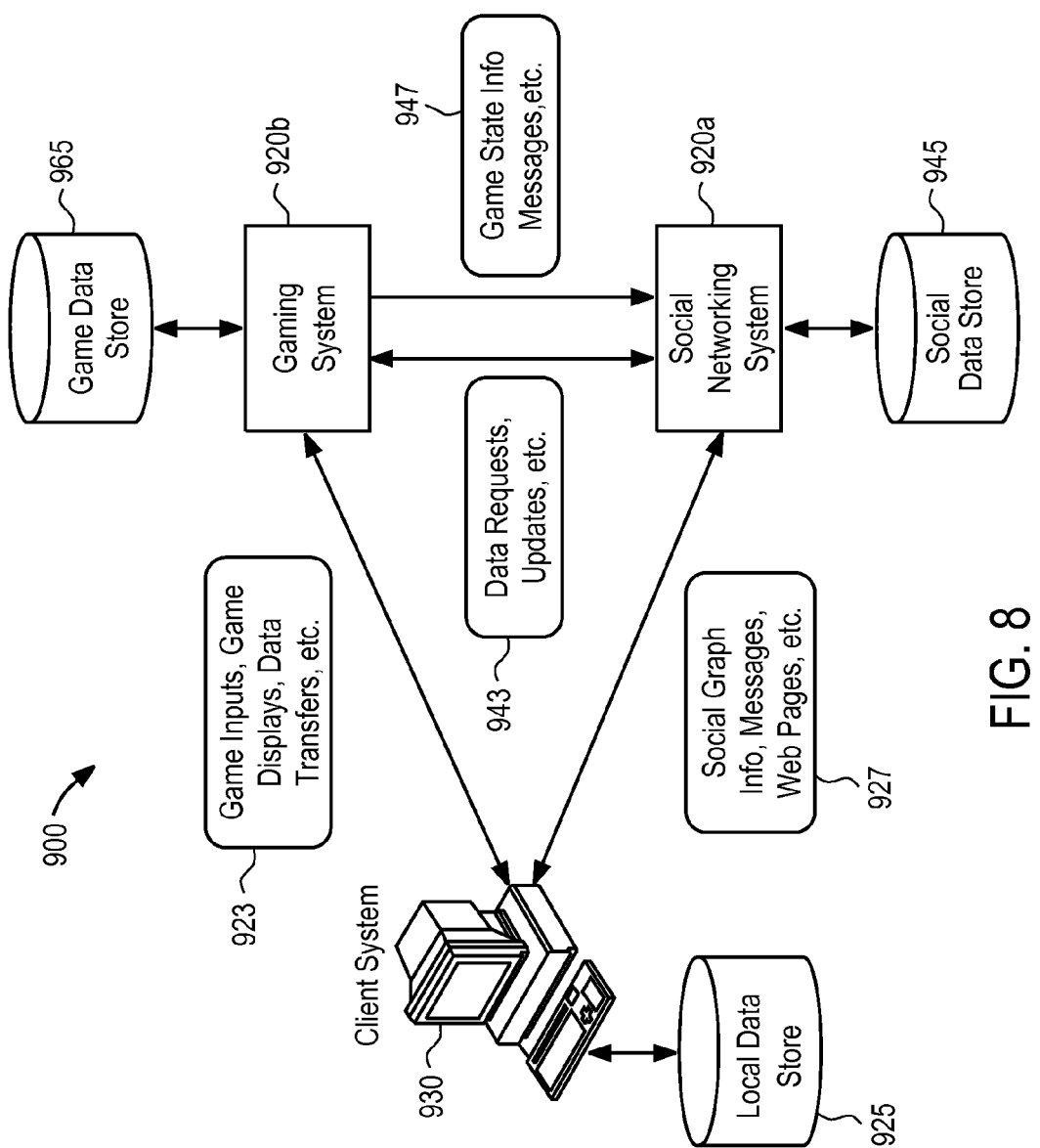
FIG. 8 illustrates an example data flow between example components of the example system of FIG. 1, according to some embodiments.

FIG. 8 illustrates an example data flow between example components of an example system 900. One or more of the components of the example system 900 may correspond to one or more of the components of the example gaming environment 100. In some embodiments, the system 900 includes a client system 930, a social networking system 920a, and a gaming system 920b. The components of system 900 can be connected to each other in any suitable configuration, using any suitable type of connection. The components may be connected directly or over any suitable network. The client system 930, the social networking system 920a, and the gaming system 920b may have one or more corresponding data stores such as local data store 925, social data store 945, and game data store 965, respectively.

The client system 930 may receive and transmit data 923 to and from the gaming system 920b. This data can include, for example, a web page, a message, a game input, a game display, a HTTP packet, a data request, transaction information, and other suitable data. At some other time, or at the same time, the gaming system 920b may communicate data 943, 947 (e.g., game state information, gaming system account information, page info, messages, data requests, updates) with other networking systems, such as the social networking system 920a (e.g., Facebook, Myspace). The client system 930 can also receive and transmit data 927 to and from the social networking system 920a. This data can include, for example, web pages, messages, social graph information, social network displays, HTTP packets, data requests, transaction information, updates, and other suitable data.

Communication between the client system 930, the social networking system 920a, and the gaming system 920b can occur over any appropriate electronic communication medium or network using any suitable communications protocols. For example, the client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the gaming system 920b, the BLOB containing the game state for the instance corresponding to the user may be transmitted to the client system 930 for use by a client-side executed object to process. In some embodiments, the client-side executable is a FLASH-based game, which can de-serialize the game state data in the BLOB. As a user plays the game, the game logic implemented at the client system 930 maintains and modifies the various game state parameters locally. The client-side game logic may also batch game events, such as mouse clicks, and transmit these events to the gaming system 920*b*. Gaming system 920*b* may itself operate by retrieving a copy of the BLOB from a database or an intermediate memory cache (memcache) layer. The gaming system 920*b* can also de-serialize the BLOB to resolve the game state parameters and execute its own game logic based on the events in the batch file of events transmitted by the client to synchronize the game state on the server side. The gaming system 920*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 930. For example, a client application downloaded to the client system 930 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 920*a*. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 930, either caused by an action of a game user or by the game logic itself, the client system 930 may need to inform the gaming system 920*b* of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the user, or the application files. In some embodiments, the client system 930 may include a Flash client. The Flash client may be configured to receive and run Flash application or game object code from any suitable networking system (such as, for example, the social networking system 920*a* or the gaming system 920*b*). In some embodiments, the Flash client is run in a browser client executed on the client system 930. A user can interact with Flash objects using the client system 930 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 930, the Flash client may send the events that caused the game state changes to the in-game object to the gaming system 920*b*. However, to expedite the processing and hence the speed of the overall gaming experience, the Flash client may collect a batch of some number of events or updates into a batch file. The number of events or updates may be determined by the Flash client dynamically or determined by the gaming system 920*b* based on server loads or other factors. For example, client system 930 may send a batch file to the gaming system 920*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 930, the gaming system 920*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, gaming system 920*b* may retrieve the corresponding BLOB from the database to determine the most-recent values of the game-related data. In some embodiments, while a user is playing the virtual game, the gaming system 920*b* also loads the corresponding BLOB into a memory cache so that the gaming system may have faster access to the BLOB and the game-related data contained therein.

Figure 9:
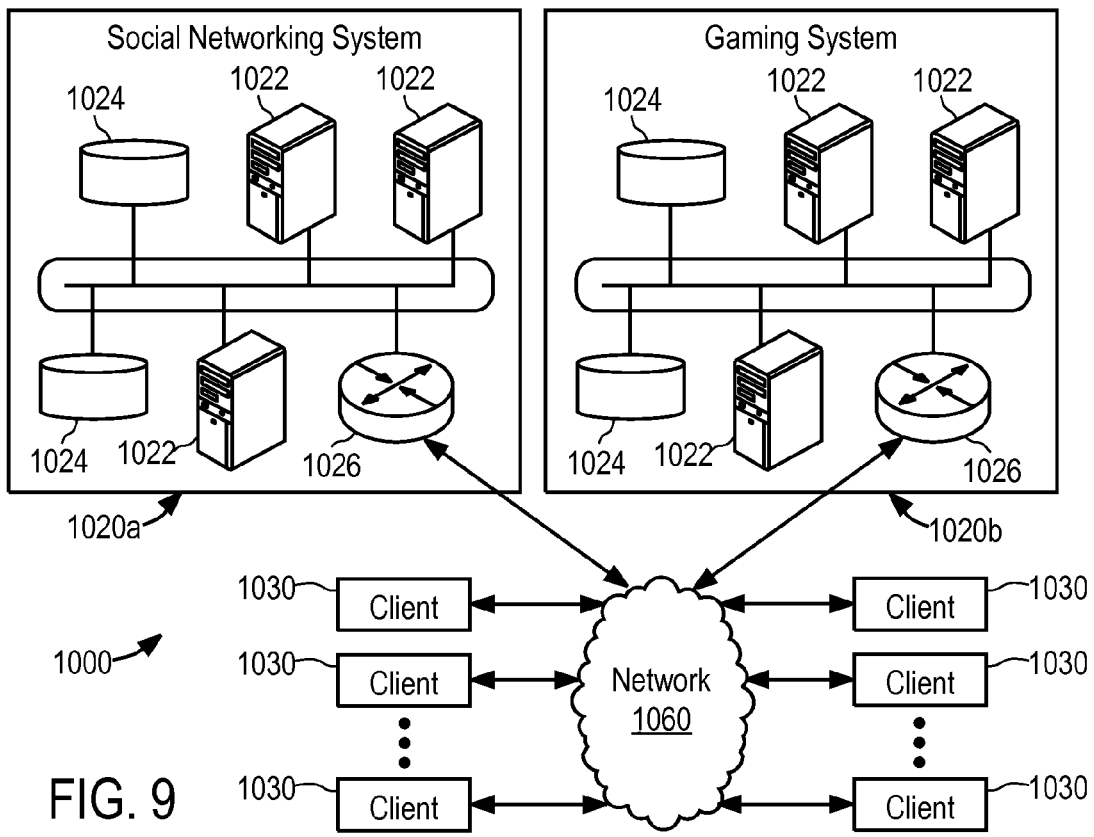
FIG. 9 illustrates an example network environment, in which various example embodiments may operate.

Various embodiments may operate in a wide area network environment, such as the Internet, including multiple network addressable systems. FIG. 9 illustrates an example network environment 1000, in which various example embodiments may operate. Network cloud 1060 generally represents one or more interconnected networks, over which the systems and hosts described herein can communicate. The network cloud 1060 may include packet-based wide area networks (such as the Internet), private networks, wireless networks, satellite networks, cellular networks, paging networks, and the like. As FIG. 9 illustrates, various embodiments may operate in a network environment 1000 comprising one or more networking systems, such as a social networking system 1020a, a gaming system 1020b, and one or more client systems 1030. The components of the social networking system 1020a and the gaming system 1020b operate analogously; as such, hereinafter they may be referred to simply as the networking system 1020. The client systems 1030 are operably connected to the network environment 1000 via a network service provider, a wireless carrier, or any other suitable means.

The networking system 1020 is a network addressable system that, in various example embodiments, comprises one or more physical servers 1022 and data stores 1024. The one or more physical servers 1022 are operably connected to the computer network cloud 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1022 may host functionality directed to the operations of the networking system 1020. Hereinafter, the servers 1022 may be referred to as server 1022, although the server 1022 may include numerous servers hosting, for example, the networking system 1020, as well as other content distribution servers, data stores, and databases. The data store 1024 may store content and data relating to, and enabling, operation of, the networking system 1020 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, the data store 1024 corresponds to one or more of a variety of separate and integrated databases, such as relational databases and object-oriented databases that maintain information as an integrated collection of logically related records or files stored on one or more physical systems. Structurally, the data store 1024 may generally include one or more of a large class of data storage and management systems. In some embodiments, the data store 1024 may be implemented by any suitable physical system(s) including components, such as one or more database servers, mass storage media, media library systems, storage area networks, data storage clouds, and the like. In one example embodiment, the data store 1024 includes one or more servers, databases (e.g., MySQL), and/or data warehouses. Data store 1024 may include data associated with different networking system 1020 users and/or client systems 1030.

The client system 1030 is generally a computer or computing device including functionality for communicating (e.g., remotely) over a computer network. The client system 1030 may be a desktop computer, laptop computer, personal digital assistant (PDA), in- or out-of-car navigation system, smart phone or other cellular or mobile phone, or mobile gaming device, among other suitable computing devices. The client system 1030 may execute one or more client applications, such as a Web browser.

When a user at the client system 1030 desires to view a particular webpage (hereinafter also referred to as target structured document) hosted by the networking system 1020, the user's web browser, or other document rendering engine or suitable client application, formulates and transmits a request to the networking system 1020. The request generally includes a URL or other document identifier as well as metadata or other information. By way of example, the request may include information identifying the user, a timestamp identifying when the request was transmitted, and/or location information identifying a geographic location of the user's client system 1030 or a logical network location of the user's client system 1030.

Although the example network environment 1000 described above and illustrated in FIG. 9 is described with respect to the social networking system 1020a and the gaming system 1020b, this disclosure encompasses any suitable network environment using any suitable systems. For example, a network environment may include online media systems, online reviewing systems, online search engines, online advertising systems, or any combination of two or more such systems.

Figure 10:
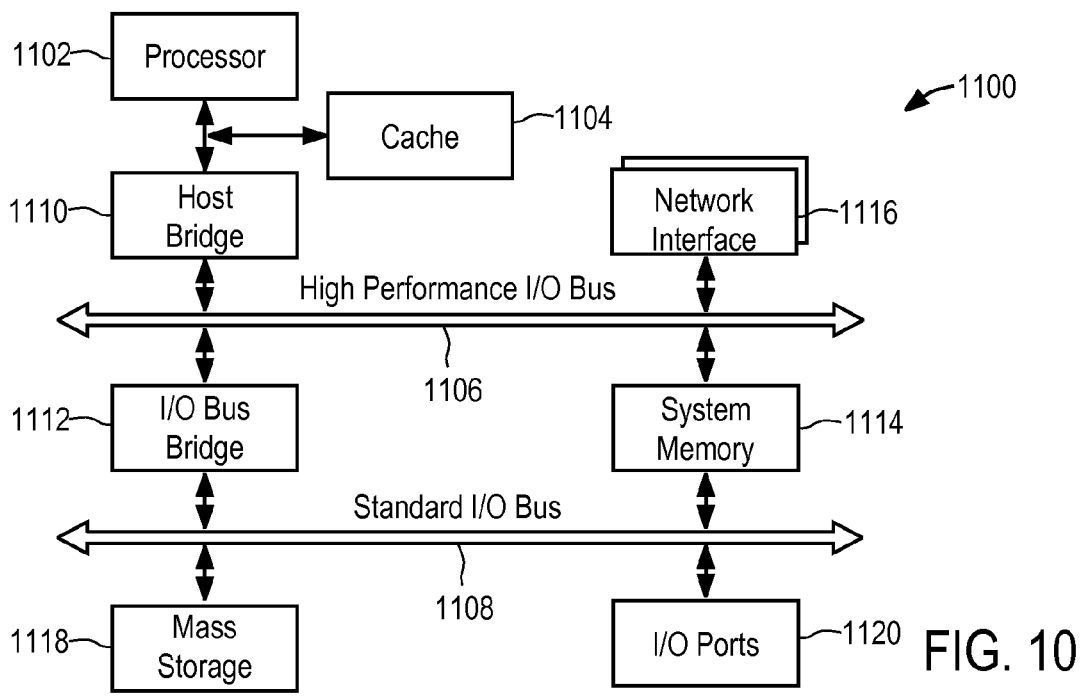
FIG. 10 illustrates an example computing system architecture, which may be used to implement one or more of the methodologies described herein, according to some embodiments.

FIG. 10 illustrates an example computing system architecture, which may be used to implement a server 1122 or a client system 1130. In one embodiment, the hardware system 1100 comprises a processor 1102, a cache memory 1104, and one or more executable modules and drivers, stored on a tangible computer-readable storage medium, directed to the functions described herein. Additionally, the hardware system 1100 may include a high performance input/output (I/O) bus 1106 and a standard I/O bus 1108. A host bridge 1110 may couple the processor 1102 to the high performance I/O bus 1106, whereas the I/O bus bridge 1112 couples the two buses 1106 and 1108 to each other. A system memory 1114 and one or more network/communication interfaces 1116 may couple to the bus 1106. The hardware system 1100 may further include video memory (not shown) and a display device coupled to the video memory. Mass storage 1118 and I/O ports 1120 may couple to the bus 1108. The hardware system 1100 may optionally include a keyboard, a pointing device, and a display device (not shown) coupled to the bus 1108. Collectively, these elements are intended to represent a broad category of computer hardware systems.

The elements of the hardware system 1100 are described in greater detail below. In particular, the network interface 1116 provides communication between the hardware system 1100 and any of a wide range of networks, such as an Ethernet (e.g., IEEE 802.3) network, a backplane, etc. The mass storage 1118 provides permanent storage for the data and programming instructions to perform the above-described functions implemented in servers 1022 of FIG. 9, whereas system memory 1114 (e.g., DRAM) provides temporary storage for the data and programming instructions when executed by the processor 1102. I/O ports 1120 are one or more serial and/or parallel communication ports that provide communication between additional peripheral devices, which may be coupled to the hardware system 1100.

The hardware system 1100 may include a variety of system architectures and various components of the hardware system 1100 may be rearranged. For example, cache memory 1104 may be on-chip with the processor 1102. Alternatively, the cache memory 1104 and the processor 1102 may be packed together as a "processor module," with processor 1102 being referred to as the "processor core." Furthermore, certain embodiments of the present disclosure may neither require nor include all of the above components. For example, the peripheral devices shown coupled to the standard I/O bus 1108 may couple to the high performance I/O bus 1106. In addition, in some embodiments, only a single bus may exist, with the components of the hardware system 1100 being coupled to the single bus. Furthermore, the hardware system 1100 may include additional components, such as additional processors, storage devices, or memories.

An operating system manages and controls the operation of the hardware system 1100, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related game objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
   generating a first instance of a user interface on a first client device and a second instance of the user interface on a second client device;
   detecting, from the first client device, user activation of a smart ping mechanic based on input received at a location in the first instance user interface within a threshold distance from a user interface feature;
   responsive to detecting the user activation, generating, for display in the first instance of the user interface on the first client device, one or more user selectable menu items each representative of a respective action to be applied to the user interface feature, wherein the one or more user selectable menu items are based on contextual data corresponding to the user interface feature; and
   responsive to detecting a user selection of particular user selectable menu item, causing display on the second client device of the particular user selectable menu item.

2. The computer-implemented method of claim 1, wherein activation of the smart ping mechanic is initiated based upon input received at the location within the threshold distance from the user interface feature mapped to the smart ping mechanic.

3. The computer-implemented method of claim 1, wherein the user interface feature comprises a representation of a given team member and a respective user selectable menu item is associated with a message to heal the given team member.

4. The computer-implemented method of claim 1, wherein the user interface feature comprises a representation of a given team member and a respective user selectable menu item is associated with a message to defend the given team member.

5. The computer-implemented method of claim 1, wherein the user interface feature comprises a representation of a given opposing team member and a respective user selectable menu item is associated with a message to attack the given opposing team member.

6. The computer-implemented method of claim 1, wherein the user interface feature comprises a collectible game object and a respective user selectable menu item is associated with a message to obtain the collectible game object.

7. The computer-implemented method of claim 1, wherein the user interface feature comprises an avatar of an opposing team member and a respective user selectable menu item is associated with a message to attack the opposing team member.

8. A computer-implemented system, comprising:
   a game engine implemented by one or more processors and configured to generate a first instance of a user interface on a first client device and a second instance of the user interface on a second client device; and
   a smart ping engine implemented by the one or more processors and configured to:
      detect, from the first client device, user activation of a smart ping mechanic based on input received at a location in the first instance user interface within a threshold distance from a user interface feature;

responsive to detecting the user activation, generate, for display in the first instance of the user interface on the first client device, one or more user selectable menu items each representative of a respective action to be applied to the user interface feature, wherein the one or more user selectable menu items are based on contextual data corresponding to the user interface feature; and responsive to detecting a user selection of particular user selectable menu item, cause display on the second client device of the particular user selectable menu item.

9. The computer-implemented system of claim 8, wherein activation of the smart ping mechanic is initiated based upon input received at the location within the threshold distance from the user interface feature mapped to the smart ping mechanic.

10. The computer-implemented system of claim 8, wherein the user interface feature comprises a representation of a given team member and a respective user selectable menu item is associated with a message to heal the given team member.

11. The computer-implemented system of claim 8, wherein the user interface feature comprises a representation of a given team member and a respective user selectable menu item is associated with a message to defend the given team member.

12. The computer-implemented system of claim 8, wherein the user interface feature comprises a representation of a given opposing team member and a respective user selectable menu item is associated with a message to attack the given opposing team member.

13. The computer-implemented system of claim 8, wherein the user interface feature comprises a collectible game object and a respective user selectable menu item is associated with a message to obtain the collectible game object.

14. A non-transitory computer-readable medium storing executable instructions thereon, which, when executed by a processor, cause the processor to perform operations comprising:

generating a first instance of a user interface on a first client device and a second instance of the user interface on a second client device;

detecting, from the first client device, user activation of a smart ping mechanic based on input received at a location in the first instance user interface within a threshold distance from a user interface feature;

responsive to detecting the user activation, generating, for display in the first instance of the user interface on the first client device, one or more user selectable menu items each representative of a respective action to be applied to the user interface feature, wherein the one or more user selectable menu items are based on contextual data corresponding to the user interface feature; and responsive to detecting a user selection of particular user selectable menu item, causing display on the second client device of the particular user selectable menu item.

\* \* \* \* \*